No. 639,104. Patented Dec. 12, 1899.
A. B. SHAW.
PNEUMATIC TIRE.
(Application filed Oct. 24, 1895.)
(No Model.)
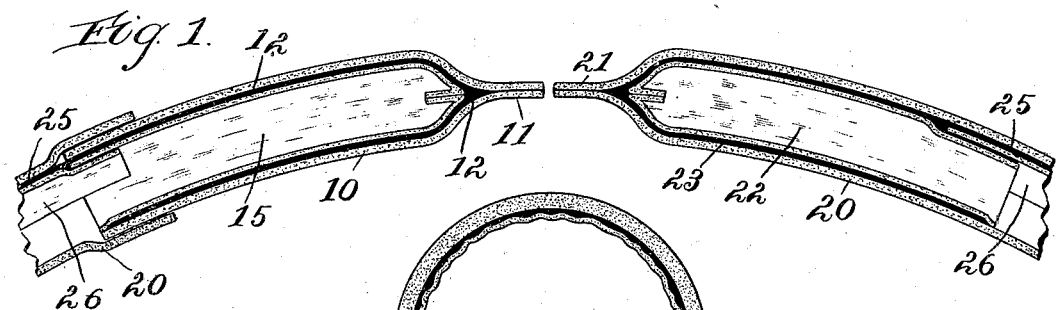
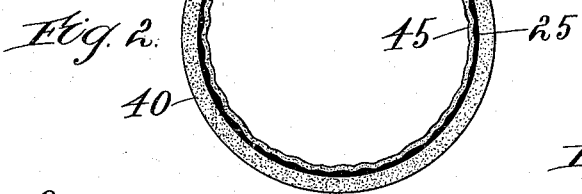
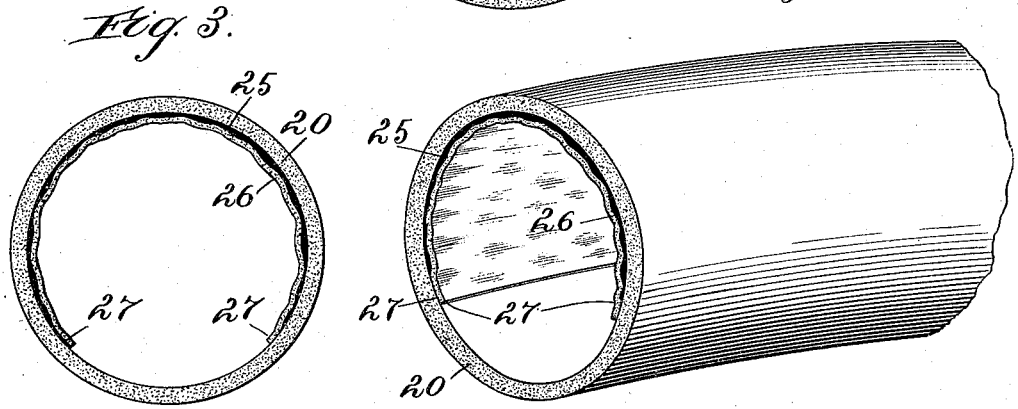
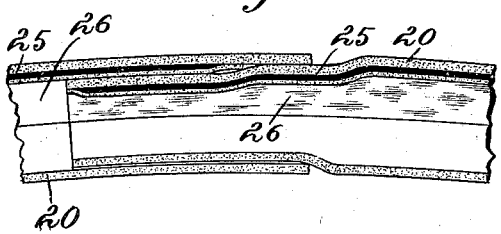
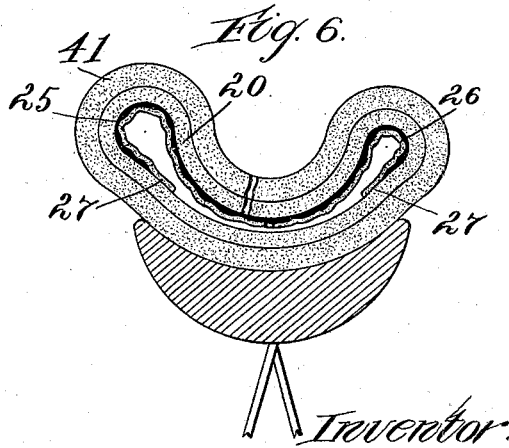
Witnesses:
Arthur T. Denand,
Margaret M. Wagner.
Inventor:
Ai B. Shaw
by Chas. G. Page Atty
THE NORRIS PETERS CO., PHOTO-LITHO., WASHINGTON, D. C.

UNITED STATES PATENT OFFICE.

AI B. SHAW, OF MEDFORD, MASSACHUSETTS, ASSIGNOR, BY MESNE ASSIGNMENTS, TO THE MORGAN & WRIGHT, OF CHICAGO, ILLINOIS.

PNEUMATIC TIRE.

SPECIFICATION forming part of Letters Patent No. 639,104, dated December 12, 1899.

Application filed October 24, 1895. Serial No. 566,699. (No model.)

*To all whom it may concern:*

Be it known that I, AI B. SHAW, a citizen of the United States, residing at Medford, in the county of Middlesex, in the State of Massachusetts, have invented a certain new and useful Improvement in Pneumatic Tires, of which the following is a specification.

This invention relates to a pneumatic tire containing means for closing such punctures as are commonly incident to pneumatic tires during use.

A prominent object of the invention is to provide simple, reliable, practical, and otherwise improved means for effecting the positive closure of punctures in pneumatic tires and to permit such closure to be readily secured by a simple manipulation of the tire by the rider without the use of either tools or implements.

Further objects are to avoid materially increasing the weight of the tire, to avoid any material impairment of the activity or resiliency of the same, to close the puncture or punctures without deadening the tire at the point or points of closure, to permit the successful closure of punctures in close proximity to one another, to render the contained puncture-repairing means effective regardless of the fact that a new puncture may happen to be made in close proximity to a puncture previously closed by such repairing means, to utilize such puncture-closing means as an auxiliary for fortifying an inner air-tube against leakage, and to secure other useful ends.

While my invention can be applied to both single and multiple or double tube pneumatic tires, its principal use is in connection with inner air-tubes for pneumatic tires. With reference to this last-mentioned application the inner air-tube is provided with an adjustable sliding flexible repairing skin or fabric which is suitable for closing punctures, as by patching, and which is caused to adhere to the tube by means of an intervening layer of adhesive or sticky lubricant, which while sufficiently adhesive to cause the opposing surfaces of the tube and skin to hold together and oppose their accidental relative movement or displacement is also of a nature to serve as a lubricant adapted to permit such relative movement or displacement to be easily effected by manually kneading or similarly working a deflated or partially-deflated tire containing such air-tube, as hereinafter more particularly described. When, therefore, a puncture is made through the air-tube and the repairing-skin, the latter can be shifted so as to bring the punctures out of register, and thereby permit the repairing-skin to positively close the puncture in the air-tube, as by patching. The condition of adherence between the two fabrics comprising the sliding repairing-skin and the air-tube is, however, maintained throughout, and hence when any portion of the repairing-skin has been shifted as a result of the manipulation of the tire for such specific purpose it will be held as shifted, since while the adhesion between the skin and tube is of a nature to allow the skin to be moved independently of the tube by proper procedure it will hold the skin against accidental independent movement, which is particularly desirable after shifting the skin and before the full inflation of the tire, since when the tire is inflated the internal air-pressure will assist in holding the repairing-skin against accidental shift. This adherence also opposes improper creeping of the skin during the use of the tire, it being observed that while the inflation of the tire will necessarily tend to hold the skin and tube together the adherence between the two will also tend to prevent any shifted portion of the skin from creeping on the tube, and that if the skin is elastic there may be a tendency toward such creeping. The repairing-skin is desirably somewhat fulled, wrinkled, or folded, so that it can be moved freely at any particular point on the body of the tube, and such skin may cover the entire inner surface of the tube or be restricted principally to the portion thereof which is adjacent to the tread of the tire.

Figure 1 of the accompanying drawings represents longitudinal sections of the overlapping end portions of what is known as a "flattened" end tube, having this improvement embodied in it. Fig. 2 represents a transverse section of a pneumatic tube embodying this invention in which the sliding skin covers the entire inner surface of the tube. Fig. 3 represents a transverse section of a pneumatic tube embodying this invention in which the inner sliding skin covers that portion of the tube which is understood to be at the tread of the tire. Fig. 4 represents a perspective view of a fragment of a pneumatic tube embodying this invention, the sliding skin covering a portion of the inner surface of the tube. Fig. 5 represents a longitudinal section of the interlapped or telescoped ends of a continuous pneumatic tube embodying this invention and in which the sliding skin covers that portion of the tube opposite the base of the tire. Fig. 6 is a cross-section through the tube in a sheath and illustrates the way in which the sheath can be manipulated for the purpose of shifting the repairing-skin.

The same reference-numerals indicate the same parts in all the figures.

The sliding and adhering adjustable skin or fabric which constitutes the prominent feature of this invention may be applied to any pneumatic tire in which it may be found useful. In Fig. 1 it is illustrated as applied to an inflating-tube of the kind known as a "vulcanized" flattened end tube, the same being a non-endless rubber tube having the walls of each of its ends pinched together and vulcanized and designed to be overlapped when the tube is placed in an outer tube or sheath. To obtain the best results, it is necessary to apply the sliding skin to the flattened end tube after the latter is vulcanized, and as one way of applying the skin the tube can be divided transversely into two sections, which can be turned inside out, so as to expose the inner surface of the tube.

In embodying the improvement illustrated in Fig. 1 a flattened end tube is divided at a point near one of its closed flattened ends into two sections, the one being a short section 10, having the flattened end 11, and the other being a long section 20, having the flattened end 21. After the tube is so divided the short section 10 is turned inside out on a short cylindrical mandrel, its flattened end covering and projecting toward one end of said mandrel, and the long section 20 is turned inside out on a long mandrel, its flattened end covering and projecting toward one end of said mandrel. The entire inner surface of the tube is thus exposed for treatment. Then the exposed surface of section 10, including the flattened end thereof, is covered or painted by means of a brush or otherwise with a coating or layer 12, composed of an adhesive semiliquid lubricant. Then a thin flatable fabric practically impervious to air is applied smoothly to the layer of adhesive lubricant and forms a tubular covering for the section 10, being separated from said section by said adhesive lubricant, except as it is cemented thereto at its inner end. Then the so-covered section is turned outside in, and what was the larger temporary exterior surface thereof becomes the smaller permanent interior surface and the previous covering of thin flexible material becomes somewhat fulled or wrinkled and constitutes the thin inner sliding or adhering adjustable skin 15 of the section 10. The adhesive lubricant causes the skin to adhere to the tube and permits it to slide relatively to the surface thereof, and the skin being fulled or wrinkled it can be readily shifted or adjusted at any desired point to close a hole in the tube. The longer section 20, which was turned inside out on a mandrel, as aforesaid, is coated or painted at its flattened end and for some distance therefrom with the adhesive lubricant and then covered with thin flexible material practically impervious to air, the flexible material serving when the section is reversed as a sliding inner skin 22 for this portion of the tube and the adhesive lubricant as an intermediate layer 23, which causes the skin to adhere to the section and permits one to slide relatively to the other. The section 20 is then painted throughout the remainder of its length and over that portion which is adjacent to the tread of the tire with a layer 25 of the adhesive lubricant, and a strip 26, composed of like flexible material and having a width somewhat exceeding half the circumference, more or less, of the tube, is laid smoothly onto the layer 25 of adhesive lubricant. This strip covers said layer and is cemented at its edges 27 beyond said layer to the body of the tube by means of rubber cement or otherwise. The section is then turned outside in and the strip 26 becomes wrinkled or fulled and constitutes the inner sliding skin for that portion of the tube. Then the inner end of the two sections 10 and 20 are interlapped and cemented together, as shown at the left-hand end of Fig. 1.

In Fig. 2 an inflating-tube 40 is shown as provided with a tubular sliding skin 45, extending all around the inner circumference thereof, being caused to adhere thereto and permitted to slide thereon by an intermediate layer 25 of adhesive lubricant. This tubular skin is cemented or fastened to the tube at any desired point or points.

When a puncture or hole is made accidentally or otherwise in the tire, the inner skin may be slid or shifted at the particular point where the puncture occurs, and thereby serves to cover and close said puncture in the same manner as it would be closed by a patch inserted on the interior of the tube. The adhesive lubricant and the flexibility and looseness of the skin permit the shifting of the latter relatively to the body of the tube, and the lubricant is sufficiently sticky or adhesive to hold it in shifted position until the tube is inflated, and then the air-pressure assists in holding it in that position permanently.

The adhesive lubricant, in addition to possessing the hereinbefore-described properties, should be of a nature to maintain such properties for a considerable period and not dry or harden, and as an effective preparation I prefer forming it of melted raw or crude rubber, to which I desirably add some substance, such as paraffin-wax, to render it of a proper consistency, although I find that some kinds of rubber when melted down will form an adhesive semiliquid lubricant having sufficient body for the purposes of this invention, and also that the adhesive semiliquid formed by thus melting rubber will maintain its condition of adhesiveness and liquidity for a long time. In forming this adhesive semiliquid lubricant of rubber the raw or crude rubber is subjected to a high degree of heat far in excess of that required in vulcanizing, whereby the rubber is melted into a liquid state, and, if necessary, a substance, such as paraffin-wax, is added to this melted rubber to increase its body or stiffness. These ingredients are mixed while hot. The proportion of wax can be about one-sixth of the weight of the liquid rubber, and the composition thus formed may be readily applied with a brush and will remain in a semiliquid state and maintain its consistency and sticky qualities for an indefinite length of time.

In Fig. 5 a lap-joint is shown in a tube having overlapping adjustable sliding skins.

In use the inflating-tube, herein described provided with an inner sliding skin, can be inserted in an outer tube or sheath 41 of the tire in the ordinary manner, and the usual valve device for inflating it is connected with it and arranged to extend through the outer tube. When a puncture occurs in the tire, the inflating-tube is suitably deflated by permitting the air to escape through the valve until the tire is collapsed. The tire is then compressed by hand or otherwise at the point where the puncture has occurred until the opposite walls of the skin meet, as illustrated by Fig. 6, and a lateral or longitudinal pressure is imparted to the tube at the point of puncture. This pressure causes the body of the tube when kneaded or manipulated so as to move laterally at said point to slide on the repairing-skin, so that the holes in the skin and body of the tube are shifted out of register and the punctures thereby closed, as by patching, it being observed that under such pressure and lateral manipulation of the tire a relative shift will take place between the fabric formed by the sliding skin and the fabric of which the inner inflatable air-tube is composed. The same results can also be secured by pinching up the tread portion of the tire and manipulating the pinched-up portion in a way to secure the proper shifting movement of the same. The tube can then be inflated, and thereby rendered ready for service. The adhesive lubricant also holds the tube and skin in adjusted position until the tube is again inflated, and after inflation the pressure, which is equal at all points on the skin, will assist in holding the tube and skin permanently in the relative positions into which they were shifted, as aforesaid.

When the sliding repairing-skin is applied to an air-tube and the latter turned inside out, as hereinbefore described, the flexibility of the skin and thinness of the lubricant prevent upsetting when the tube is inflated within a tire-sheath—that is to say, the wrinkled tubular skin will not be compressed into a smooth tube, but will remain fulled or wrinkled, whereby it can be shifted with comparatively no stretching, and hence if elastic, as will be the case if it is made of rubber, its elasticity will not at any time materially overcome the disposition of the adhesive lubricant to prevent accidental shifting of the skin. This sliding skin enables any number of punctures to be readily sealed by the rider without removing the tire from the wheel, and holes of comparatively large size may be successfully closed by this means, and while the adhesive lubricant will not of itself practically seal the puncture it will temporarily retard the escape of air through a small opening, as a pin-hole. The presence of this adhesive lubricant and repairing skin or lining will also render the air-tube practically perfect, and hence will admit of the use of a comparatively thin and light air-tube. This arrangement will also exclude air from between the tube and the shifting skin or lining, it being seen that any slight space between the two will be occupied by the adhesive lubricant, and that the latter will therefore not be exposed. Any portion of the repairing-skin can be shifted for the purpose of repairing a puncture, and should a new puncture occur at a point near a puncture which has been previously closed the repairing skin or lining can be shifted at the point where the last puncture has been made without disturbing the portion of the skin covering the prior puncture, the last-mentioned portion of the skin being in such case held from shifting by reason of its adhesion to the air-tube.

My improvement can also be embodied in a "hose-pipe" tire, as will be obvious without further description.

What I claim as my invention is—

1. An inflating-tube for a vehicle-tire, having closed vulcanized flattened ends, said tube being composed of a plurality of sections opening into one another and overlapped and cemented together, each of said sections having an inner sliding skin, and an intermediate layer of adhesive semiliquid lubricant between said skin and the body of the section, said adhesive semiliquid lubricant permitting the skin to be relatively shifted at any given point upon the body of the tube for closing a hole as by patching.

2. A pneumatic tire containing puncture-closing means comprising a layer of melted rubber confined between and in adherence with layers of suitable fabric.

3. A pneumatic tire containing puncture-closing means consisting of a sliding fabric suitable for closing punctures, and a layer of melted rubber confined between the sliding fabric and the fabric of the tire it is to repair.

4. A pneumatic tire containing puncture-closing means consisting of a sliding fabric suitable for closing punctures and a layer of adhesive semiliquid lubricant consisting of melted rubber as a base, confined between the sliding fabric and the fabric it is to repair.

AI B. SHAW.

Witnesses:
CHARLES G. PAGE,
FRED W. MORGAN.